April 6, 1965 G. H. MORRIS 3,176,781
TWO SECTION DEEP TILLAGE CULTIVATOR
Filed Aug. 16, 1962 5 Sheets-Sheet 4
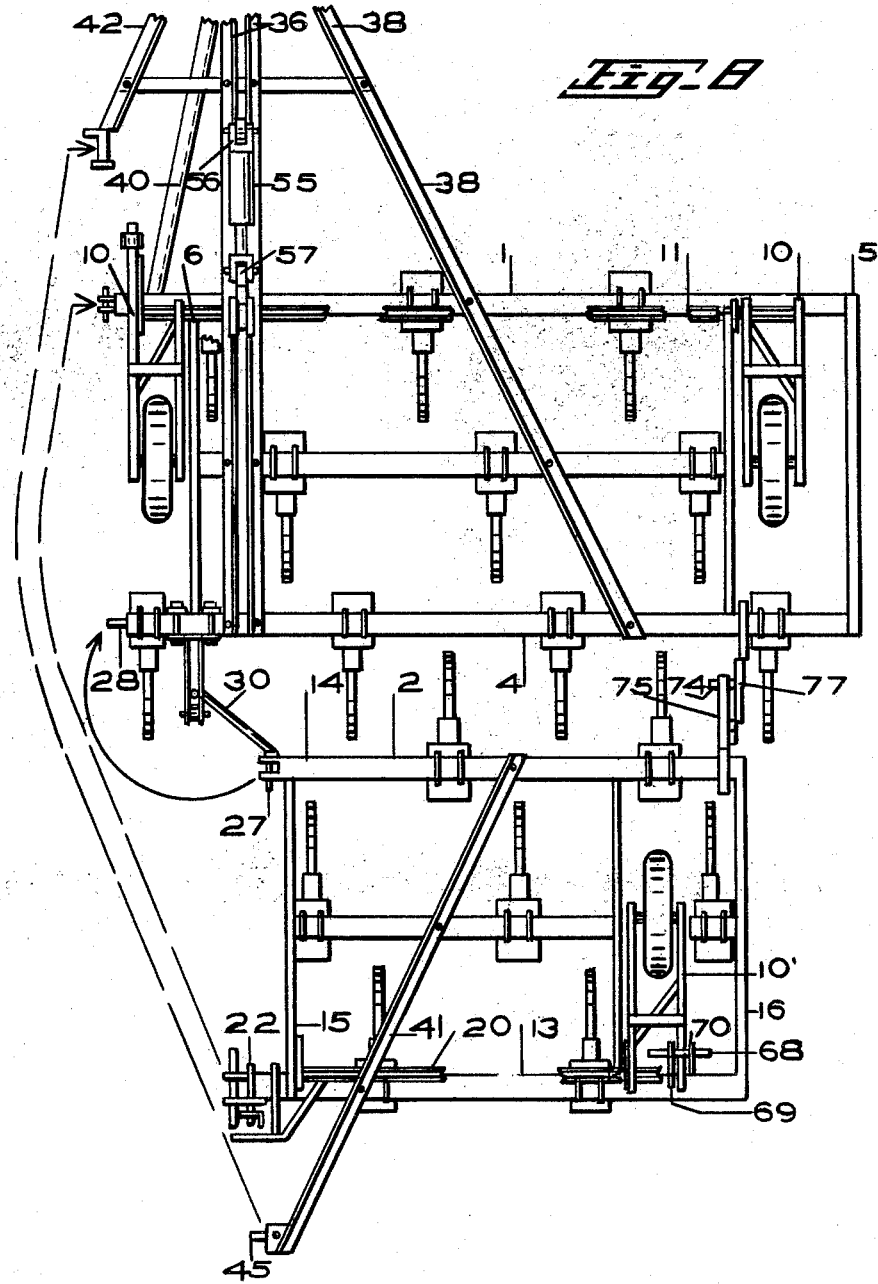

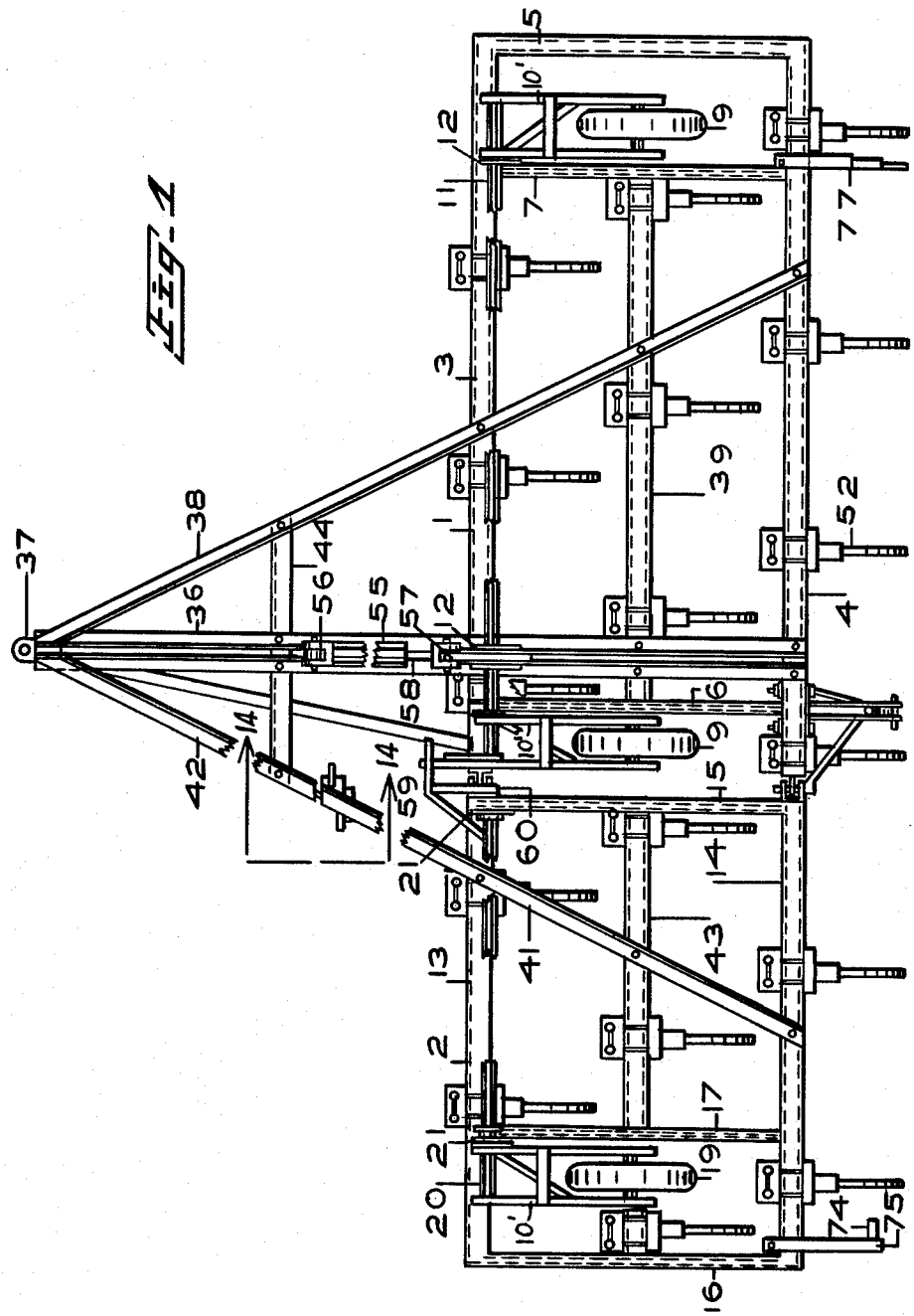

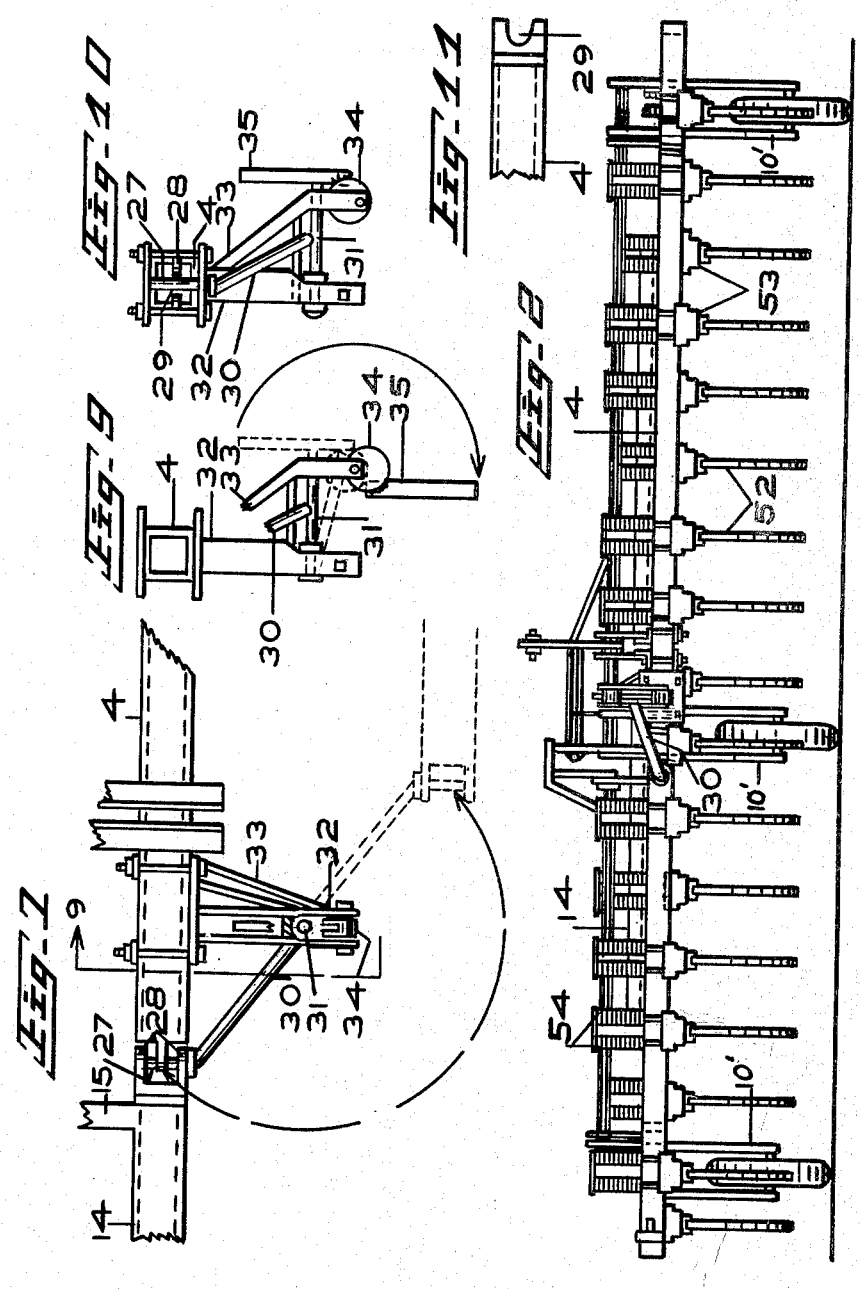

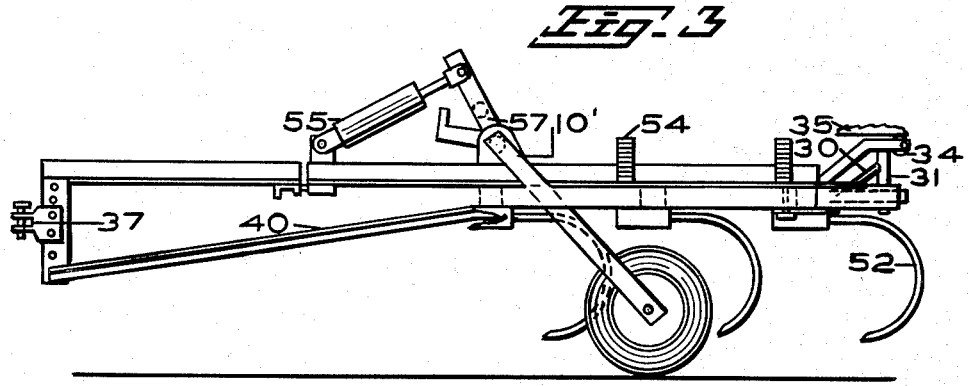
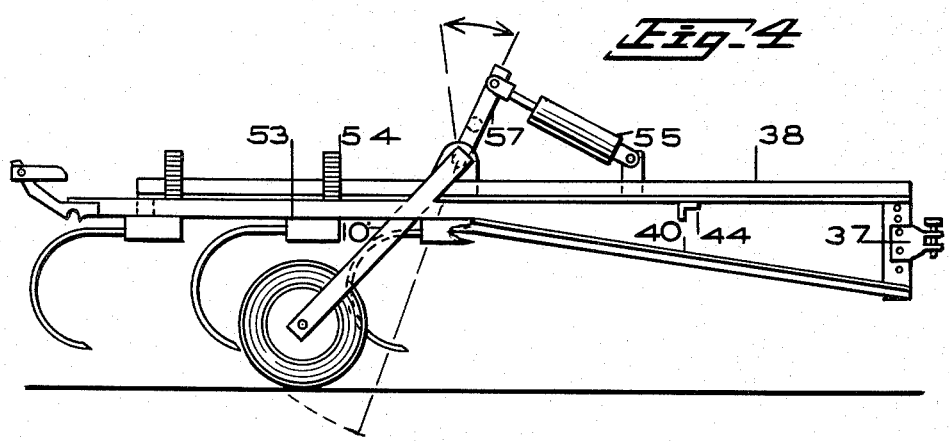
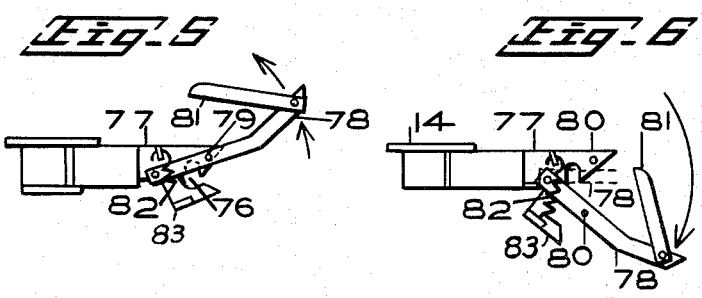

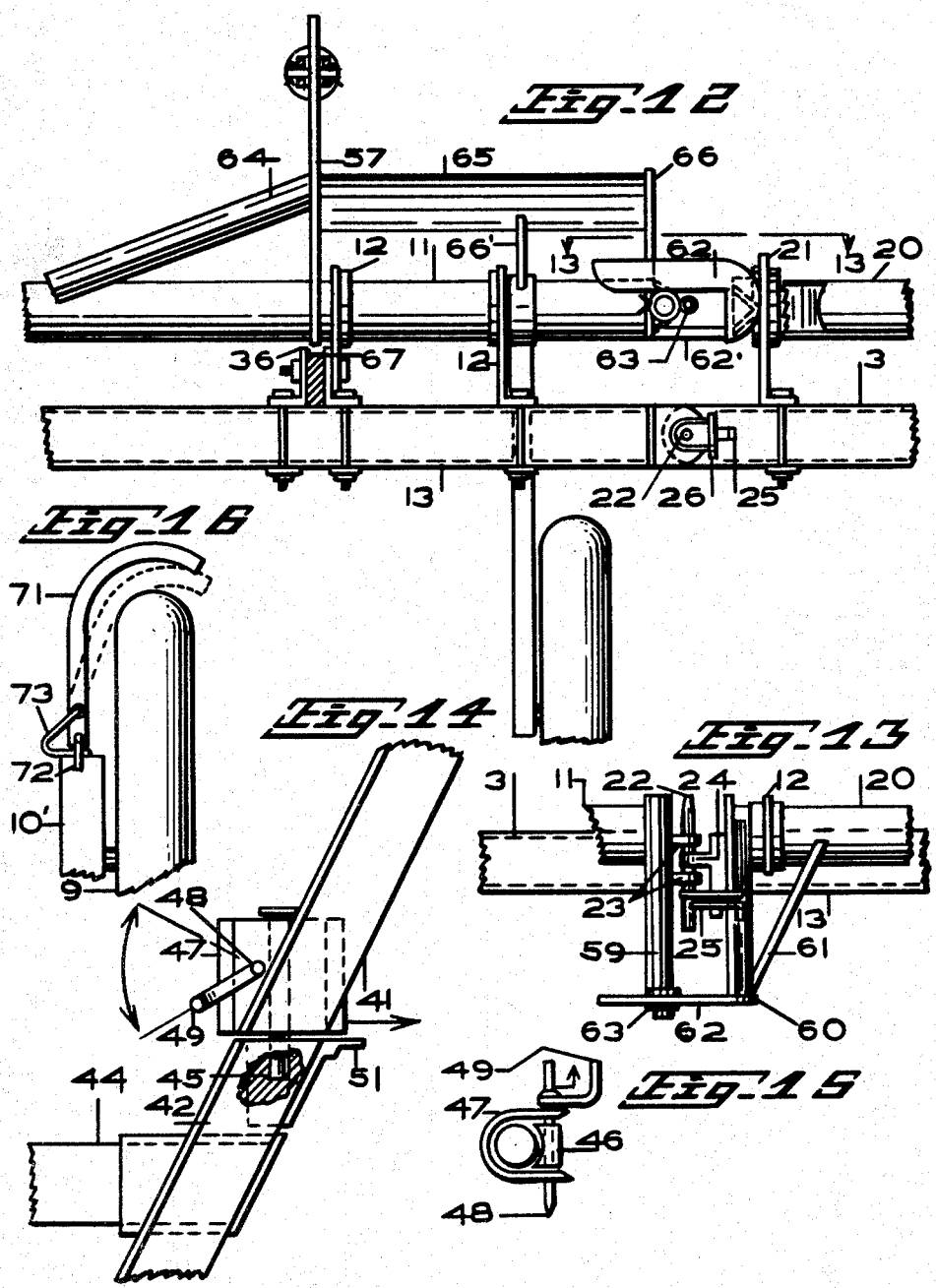

United States Patent Office 3,176,781
Patented Apr. 6, 1965

3,176,781
TWO SECTION DEEP TILLAGE CULTIVATOR
George Henry Morris, 37 6th Ave. N., Yorkton,
Saskatchewan, Canada
Filed Aug. 16, 1962, Ser. No. 217,315
6 Claims. (Cl. 172—395)

This invention relates to cultivators of the heavy duty or deep tillage type, having particular reference to a cultivator having two sections connectable for travel in line abreast for working and in line ahead for movement on the road.

In the art to which the invention relates it is desirable to have a cultivator of considerable width, for use particularly on the larger farms, but such an implement is too wide for transport from one field to another, through gates and on narrow highways.

The present device is formed in two sections pivotally attachable together in working position end to end, permitting it to conform to the contour of the land, and with one of the sections movable to the rear of the other for travel. For this the sections are pivotally connected at the rear to permit one section to be turned into a reversed position behind the other and attachable for travel that way.

Additionally the sections have to be raised and lowered on supporting wheels, as is common in the art, for travel and for work, for which a hydraulic element is used, the present device providing an improved connection by which the two sections may be raised and lowered by a single element. There is also a novel draft bar in fixed attachment to the one section and disengageable from the other section and permitting movement of the sections in relation to each other between travel and working positions, and in conjunction with this pivotal connection between the sections automatically engageable when the sections are moved into line for work and disengageable for movement into line for travel.

Other features and advantages of the invention will become apparent by reference to the accompanying description taken in conjunction with the drawings.

In the drawings, wherein is illustrated a preferred embodiment of the invention, FIG. 1 is a top plan view of a cultivating implement in accordance with my invention, shown with the two sections connected in line for working, parts being shown broken away for convenience of illustration.

FIG. 2 shows a rear view of the implement with the sections connected as in FIGURE 1.

FIG. 3 is a side view of the implement taken from the left side and shown with the cultivating elements raised.

FIG. 4 is a view similar to that in FIGURE 3, but taken from the right side of the implement, and further indicating the movement of the hydraulic element lever and wheel forks.

FIG. 5 is an enlarged detail side view showing the latch attachment on the main section for engagement of the keeper pin on the secondary section, shown with the locking lever raised to a position for engagement of the keeper pin.

FIG. 6 is a view similar to FIGURE 5, but with the latch depressed and indicating in dashed lines, broken away, the position of the latch when raised.

FIG. 7 is an enlarged top view of fragments of the cultivator frames for the two sections, including the rear interlocking engagement between the sections and the pivotal attachment of the sections rearwardly together, the movement of the one section in relation to the other being indicated by dashed lines.

FIG. 8 is a top plan view of the implement assembled for travel with the one section connected to the rear of the other section and reversed, shown in part broken away.

FIG. 9 is an enlarged side view taken on a line 9—9 of FIGURE 7, showing the elements for pivotal rearward attachment of the sections together, shown as it would be with the sections connected for travel, parts being shown broken away.

FIG. 10 is an enlarged side view showing the elements for pivotal rearward attachment of the sections together, taken as it would be with the sections connected in line for work.

FIG. 11 is an enlarged side view of a fragment of the rear main frame bar including the lug for interlocking engagement between the sections.

FIG. 12 is an enlarged front view showing the connection between the rocker shafts of the main and secondary sections, including the mounting for the shafts on the front frame bars, and the front interlocking engagement between the section frames, showing fragments only of the shafts and frame bars, and with the filling spacer between the main draft bars in section, and further with parts broken away.

FIG. 13 is an enlarged top view showing fragments of the front frame bars and the rocker shafts, and the elements for locking engagement between the frame bars and between the shafts.

FIG. 14 is an enlarged top view of fragments of the side draft brace bar for the secondary section of the implement and including a fragment of the forward cross bar.

FIG. 15 is a rear end view of the locking attachment for connecting the two parts of the draft brace bar for the secondary section.

FIG. 16 is a rear end view of a fragment of the wheel and fork for the secondary section, and including the brake for the wheel, the brake being shown in engageable relation to the wheel by dashed lines.

Having reference to the drawings, the implement is made up of two sections, a main section 1 (FIGS. 1–8) and a secondary section 2.

The main section consists of a rectangular frame formed of front and rear frame bars 3 and 4, and a cross bar 5 at the outer end, and a further cross bar 6 spaced from the inner ends of the front and rear frame bars. Additionally there is a cross bar 7, which with the cross bar 5 sets off an area in which, and in the space between the cross bar 6 and the inner ends of the frame bars 3 and 4, are mounted wheels 9 in forks 10 that are rigidly attached to a rocker shaft 11 mounted to be rotated in bearing plates 12 attached to the frame cross bars 6 and 7, and for which there are additional bearing plates as indicated in FIGURE 1.

The secondary section (FIGS. 1–8) consists of a similar rectangular frame formed of front and rear frame bars 13 and 14, and end cross bars 15 and 16, and includes an intermediate cross bar 17 spaced from the outer cross bar 16. In the space between the cross bars 16 and 17 is mounted a supporting wheel 19 in a fork 10' rigidly attached to a rocker shaft 20 mounted free to be rotated in bearing plates 21 on the frame bar 13, this shaft axially aligning with the rocker shaft 11 when the sections are in line abreast.

Forwardly the frame sections are connected by a coupling pin 22 (FIG. 13) carried in lugs 23 on the end of the frame bar 3 and engageable with a lug 24 on the end of the frame bar 13. The pin 22 has attached thereto a handle 25 engageable with a latch 26 on the frame bar 3.

Rearwardly the inner end of the frame bar 14 has a pin 27 carried in lugs 28 (FIGS. 7 and 11), the pin being engageable by a socket 29 formed in the end of the frame bar 4. The one end of the pin 27 has integral therewith or welded thereto a pivot bar 30 with which is integrally fixed a rod 31 (FIGS. 7, 9 and 10) mounted to turn in a bracket 32 fixed to the main frame bar and in a brace 33 attached to the bracket 32. The outer end of the brace 33 carries an eccentric 34 mounted to be rotatable and to which is attached a handle 35. The rod 31 is also mounted free to swing back in the bracket 32, as indicated in FIGURE 9, and for travel of the implement between fields or on the road the eccentric 34 would be turned by the handle 35, as in FIGURE 9, allowing a certain amount of play to the connection of the pivot bar to the frame bar 4.

The draft connection for the implement (FIGS. 1–8) consists of a draft bar 36 formed of two angle irons spaced apart and attached fixed to the frame bars 3 and 4 about equidistant the length of the combined sections. Forwardly the draft bar 36 has attached thereto a bridle 37 (FIGS. 3–4) with clevis, and is braced to the main section 1 by an angling brace bar 38 fixed to the main section frame bars 3 and 4 (FIGS. 1–8) and to an intermediate frame bar 39 between the cross bars 6 and 7. There are further brace bars 40 connected to the lower end of the bridle 37 at each side and extending back to the frame bar 3, as shown shown in FIGURES 3 and 4.

A brace bar from the draft bar to the secondary section (FIGS. 1–8) is formed of two sections 41 and 42, the section 41 attaching to the frame bars 13 and 14, and to the intermediate frame bar 43 between the cross bars 15 and 17. The section 42 of the draft brace bar for the secondary section is fixed to the forward ends of the draft bar 36 and is braced by a cross bar 44 attached to the bars 36 and 38.

This brace bar has its two sections (FIGS. 14–15) pivotally connected by a pin 45, which is held by a block 46 in a bracket 47 attached to the underside of the section 41. A pin 48 having a handle 49 holds the block 46 in the bracket 47 securing the pin 45. The pin 45 is fixed to a block 51 on the underside of the brace bar 42. This connection is designed to allow the parts 41 and 42 a limited play to accommodate the contours of the land.

The frame bars 3, 4 and 39 of the section 1 and the frame bars 13, 14 and 43 of the section 2 carry shanks 52 suspended by saddle clamps 53 and mounting soil working shovels are points, the shanks pivotally mounting on the frame bars cushioned by pressure springs 54 (FIG. 2) as is common in the art.

For raising and lowering the shanks 52 carrying the soil working points, a hydraulic element 55 is provided pivotally anchored by a bracket 56 (FIGS. 1–8) to the draft bar 36. On the rocker shaft 11 of the frame section 1 is fixed an upstanding lever arm 57 to which the piston rod 58 of the hydraulic element is adjustably attachable.

In order to simultaneously raise and lower the soil working shanks of the secondary section an arm 59 (FIGS. 12–13) is fixedly secured to the rocker shaft 11 and in opposing relation to which is a similar arm 60 fixed to the rocker shaft 20. The arm 60 is braced to the shaft 20 by a brace bar 61 and has fixed to the outer end of the arm an actuating arm 62 bearing against a roller 63 on the arm 59. By this when the shank 11 is turned to raise the main section 1 on its supporting wheels the arm 59 is moved upwards, and this arm bearing against the actuating arm 62 moves the arm 60 upwards and correspondingly turns the rocker shaft 20. In the reverse movement for lowering the sections 1 and 2 by reversing the movement of the rocker shaft 11 the actuating arm 62 being no longer supported by the arm 59 allows the secondary section to gravitate downward. A positive downward movement of the secondary section could be accomplished by a second actuating arm 62′ on the arm 60 bearing against the underside of the roller 63 on the arm 59.

The hydraulic lift lever arm 57 on the rocker shaft 11 is braced by a bar 64 on the one side, and on the other by a tubular brace 65 attached to an upright 66 fixed to one end of the shaft 11. This brace aids in carrying the twist or torsion from the arm 57 to the shaft 11. Additionally a plate 66′ with an integral U-shaped base portion fixed on the shaft 11 further reinforces the brace 65.

A spacer 67 (FIG. 12) is provide between the draft angle irons 36.

In the use of the device, with the sections connected in working position, as shown in FIGURE 1, to disengage the secondary section and move it to the position for road travel, shown in FIGURE 8, the hydraulic element is first used to raise the sections to their maximum height. In that position the fork 10′ of the secondary section (FIG. 8) is engaged by a pin 68 passed through suitable openings in arms 69 and 70 fixed to the frame bar 13, this serving to hold the secondary section raised after the rocker shaft 20 is disengaged from the rocker shaft 11.

Next the pin 22 (FIGS. 13 and 8) is removed, disengaging the lug 24 from the lugs 23, and the pin 48 is removed disengaging the front brace section 42 from the rear brace section 41.

A brake 71 (FIG. 16) that is pivotally mounted on the fork 10′ for the secondary section supporting wheel by a bracket 72 is moved into locking engagement over the front of the wheel, as shown in dashed lines. When not required the brake can be secured in a vertical position by a pivotally attached locking element 73.

The tractor is then driven forward and swung to the right and with the wheel of the secondary section braked the rear section 41 of the left brace bar can swing outward from the front section 42, and the forward lugs 23 (FIG. 13) will disengage from the lug 24, thus allowing the secondary frame section to swing on the rod 31 (FIGS. 7, 9, and 10) that is attached to the pivot bar 30 and pin 27.

When the secondary section 2 has been turned into position behind the main section 1, as in FIGURE 8, it is secured by a pin 74 (FIGS. 1–8) on an arm 75 attached to the frame bar 14. This pin engages in a socket 76 on a latch 77 (FIGS. 8–5–6) that is attached to the rear main section frame bar 4. On the latch 77 is pivotally attached a lever 78 with an integral lug 83. When the lever is moved into the upward position shown in FIGURE 5 it closes the socket 76 and secures the pin 74 therein. The lever is then held in the closed position by a spring 82 attached to the latch 77 and lug 83 and secured by inserting a pin 79 through suitable openings, as at 80, through the latch 77 and lever 78. The brake bar 71 is then disengaged and the cultivator is ready for road transportation. To swing the secondary section back into working position the brake 71 is placed over the rear of the wheel tire. The lever 78 (FIGS. 5 and 6) is moved down, for which the lever extension 81 is swung out, this giving extra leverage. This will allow the pin 74 to disengage from the latch 77 when the tractor is driven forward and swung to the left to bring the sections into line abreast, when the pins 22 and 48 are replaced and pin 68 removed, and with the lever 35 (FIG. 10) swung forward the cultivator is in normal working position.

I claim:

1. In a cultivator having main and secondary sections, said sections including wheel supported frames carrying soil working elements, and means forwardly connecting the frames together in line abreast disengageable the one from the other; means rearwardly connecting the sections, said means including an arm fixed to the rear inner end of the secondary section rearwardly projecting and inclined outwardly therefrom, a bracket fixed to the rear inner end of the main section rearwardly projecting, means pivotally connecting said arm and bracket with the secondary section movable into reversed relation to the main section, an arm on the bracket, a rod mounted free to turn in the arm and bracket pivotally movable in the bracket and slidable backward and forward in the arm between a vertical position and a rearwardly inclined position, and cam means mounted in the bracket for holding said arm in its vertical position and movable to permit the arm to move freely within the limits provided for movement of the arm in the bracket, an arm on the outer end of the secondary section rearwardly projecting, and latch means on the main section with which said arm is automatically engageable when the secondary section is moved into reversed position behind the main section.

2. In a cultivator having main and secondary sections, said sections including wheel supported frames carrying soil working elements, and means forwardly connecting the frames together in line abreast disengageable the one from the other; means rearwardly connecting the sections, said means including an arm fixed to the rear inner end of the secondary section rearwardly projecting and inclined outwardly therefrom, a bracket fixed to the rear inner end of the main section rearwardly projecting, means pivotally connecting said arm and bracket with the secondary section movable into reversed relation to the main section, an arm on the outer end of the secondary section rearwardly projecting, and latch means on the main section with which said arm is automatically engageable when the secondary section is moved into reversed position behind the main section, a rocker shaft mounted in each section and alignable when the sections are in line abreast, forks fixed to the rocker shafts and in which the supporting wheels for the sections are mounted, hydraulic means anchored in the main section and connected to the rocker shaft in said section for raising and lowering the section on its supporting wheels, and means disengageably connecting the rocker shafts when the sections are in line abreast and by which turning the main section rocker shaft for raising and lowering said section on its supporting wheels turns the rocker shaft in the secondary section for raising and lowering the secondary section on its supporting wheels.

3. In a cultivator formed of two hinged connected sections for travel in line abreast, each including a frame and wheels supporting the frame, said wheels having forks in which they are mounted and the frames each having a rocker shaft mounted to turn axially and to which the forks are fixed, said shafts aligning axially, and including hydraulic means mounted in one of the frames connected for turning the rocker shaft therein for raising and lowering the frame on its wheels; means connecting said shaft for correspondingly turning the other of said shafts when said shafts are aligned, said means including an arm projecting laterally from each shaft extending parallel to each other, and an actuating arm fixed to the other end of one of said projecting arms and overlying the other by which turning the rocker shaft on one section by the hydraulic means correspondingly turns the other rocker shaft.

4. A cultivator as set out in claim 3 in which the frames are rearwardly pivotally connected for the one section to be moved into reversed position behind the other section, means forwardly connecting the sections for travel in line abreast and disconnectable the one from the other, and means for connection of the rear outer ends of the sections for the reversable section to travel in line behind the other section.

5. In a cultivator made up of two sections each having a frame, and including wheels supporting the frames and means on the inner forward ends of the sections engageable for securing the sections together and disengageable the one from the other, means pivotally rearwardly connecting the sections with the one section movable into reversed following relation to the other section, said means comprising a bracket fixed to the one section extending rearward, a pivot bar connected at one end to said bracket with the bar and bracket free to move horizontally in relation to each other and held against relative vertical movement, and coupling means connecting the sections to pivot vertically in relation to each other and limited by the pivot bar to said relative vertical movement.

6. In a cultivator having main and secondary sections, said sections including wheel supported frames carrying soil working elements, and means forwardly connecting the frames together in line abreast disengageable the one from the other; means rearwardly connecting the sections, said means including an arm fixed to the rear inner end of the secondary section rearwardly projecting and inclined outwardly therefrom, a bracket fixed to the rear inner end of the main section rearwardly projecting, means pivotally connecting said arm and bracket with the secondary section movable into reversed relation to the main section, and means for automatically connecting the outer ends of the two sections together when the one section is moved into reversed following relation to the other, said means comprising an arm fixed on the section to be reversed rearwardly projecting, said arm having a laterally projecting pin, and a latch fixed on the other section rearwardly projecting, said latch having the outer under side thereof inclined upwards towards the outer end of the ltach, when the other section is reversed the latch may engage and ride upward on the pin, said latch having a socket on the under side thereof engageable with said pin, and a spring held locking lug pivotally mounted on the latch and normally holding the pin engaged in the socket.

References Cited by the Examiner
UNITED STATES PATENTS

| | | | |
|---|---|---|---|
| 2,052,302 | 8/36 | Johnson et al. | 172—568 |
| 2,834,277 | 5/58 | Tanke | 172—275 X |
| 2,973,818 | 3/61 | Marvin | 172—626 X |

SAMUEL KOREN, *Primary Examiner.*

T. GRAHAM CRAVER, *Examiner.*